United States Patent
Hyyppa et al.

(10) Patent No.: US 7,848,740 B2
(45) Date of Patent: Dec. 7, 2010

(54) ELECTRONIC TRANSACTIONS

(75) Inventors: Petri Hyyppa, Oulu (FI); Lauri Piikivi, Oulu (FI); Panu S. Markkanen, Oulu (FI); Piotr Cofta, Helsinki (FI)

(73) Assignee: Nokia Corporation, Espoo (FI)

( * ) Notice: Subject to any disclaimer, the term of this patent is extended or adjusted under 35 U.S.C. 154(b) by 1010 days.

(21) Appl. No.: 10/085,937

(22) Filed: Feb. 28, 2002

(65) Prior Publication Data

US 2002/0193102 A1 Dec. 19, 2002

(30) Foreign Application Priority Data

Mar. 2, 2001 (GB) .................................. 0105264.6

(51) Int. Cl.
H04M 3/42 (2006.01)
(52) U.S. Cl. ..................... 455/419; 455/466
(58) Field of Classification Search .............. 455/414.3, 455/418, 419, 420, 466, 403, 410, 411, 414; 370/352; 705/73, 67
See application file for complete search history.

(56) References Cited

U.S. PATENT DOCUMENTS

| 5,878,337 | A | 3/1999 | Joao et al. ................... 455/406 |
| 6,577,861 | B2 * | 6/2003 | Ogasawara ................. 455/419 |
| 2001/0037254 | A1 * | 11/2001 | Glikman ...................... 705/26 |
| 2001/0037312 | A1 * | 11/2001 | Gray et al. ................... 705/67 |
| 2001/0044751 | A1 * | 11/2001 | Pugliese et al. ............... 705/26 |
| 2008/0195551 | A1 * | 8/2008 | McIsaac et al. ............... 705/75 |

FOREIGN PATENT DOCUMENTS

| EP | 0 917 120 | 5/1999 |
| EP | 0 950 968 | 10/1999 |
| EP | 1 030 272 | 8/2000 |
| JP | 63-065550 | 3/1988 |
| JP | 10-91407 | 4/1998 |
| JP | 2001-56758 A | 2/2001 |
| WO | WO 98/37663 | 8/1998 |

OTHER PUBLICATIONS

Tabb, L., "*The Latest Tend in U.S.A., The Internet broadens securities invetor base, Attainment of strategic investor base is a focus of battle.*", Nikkei Business Publications, Inc., Dec. 31, 1998, pp. 110-122.

Nakamichi, T. et al., "*Companies including IBM start to create a protocol which enables share of data among all information equipments.*", Nikkei Business Publications, Inc., Mar. 22, 2000, vol. 22, pp. 19.

Kurihara, M., "*'Keitai' beyond PC, which may be the leading role in next generation mobile system*", Nikkei Computer, Japan, Nikkei Business Publications, Inc., Aug. 14, 2000, vol. 502, pp. 118-131.

Search Report for corresponding European Application No. EP 02250989.7-2221 dated Mar. 29, 2007.

* cited by examiner

*Primary Examiner*—Lester Kincaid
*Assistant Examiner*—Phuoc Doan
(74) *Attorney, Agent, or Firm*—Ditthavong Mori & Steiner, P.C.

(57) ABSTRACT

A method in a user equipment for enabling use thereof in electronic transactions is disclosed. In the method control information is received at the user equipment (1) from a management entity (12). The user equipment is provided with transaction means based on the received control information.

26 Claims, 3 Drawing Sheets

ELECTRONIC TRANSACTIONS

FIELD OF THE INVENTION

The present invention relates to electronic transactions, and in particular, but not exclusively, to electronic transactions that are processed by means of an electronic device such as a mobile user equipment.

BACKGROUND OF THE INVENTION

Various user equipment such as computers (fixed or portable) mobile telephones, personal data assistants or organisers and so on are known by the skilled person. A user equipment can be defined as a means that the user may use for different tasks such as for processing information and/or for communication. A mobile user equipment referred to as mobile station can be defined as means that is capable of communication via a wireless interface with another device such as a base station of a mobile telecommunication network or any other station. Such a mobile user equipment can be adapted for voice, text message or data communication via the wireless interface.

A user equipment could also be used for exchange of confidential or private information such as exchange of data that associates with electronic transactions between two or more parties. The possible electronic transactions could include, without restricting the scope of this specification to these, transactions such as ordering of goods and/or services, transactions that associate with payment of purchased goods and/or services, provision of a receipt or other confirmation of payment or purchase, financial services (e.g. different banking services), betting services and so on.

A user equipment could also be used for exchange and/or storage of other confidential information such as personal identification data, passport data and so on. It shall thus be appreciated that in this specification the term 'transaction' is not restricted to commercial transactions between at least two parties but instead the term transaction refers to exchange of any confidential information.

A common transaction mechanism is required so that electronic transactions can be accomplished between two entities. In general term, a typical transaction mechanism can be defined to comprise features such as the communication media between the parties, predefined transaction protocols and parameters, predefined content transfer and presentation formats, security mechanisms and other functions that may also associate with an electronic transaction between the parties.

The inventors have found that at the present there is no common transaction mechanism that could be used by a user equipment for electronic transactions with different parties and/or for situations where a transaction involves a new party. Instead, a user of a user equipment may be prevented from the transaction for simple reason that his/hers user equipment cannot co-operate with the other party of the transaction. In addition, the inventors have also found that it could be advantageous if the transaction mechanisms of a user equipment could be modified from time to time e.g. for security reasons or to keep the user equipment updated with the most recent developments of the electronic transaction mechanisms. It could also be advantageous if a transaction mechanism could be initiated i.e. invoked based on a request by the user.

SUMMARY OF THE INVENTION

Embodiments of the present invention aim to address one or several of the above problems by providing a way to modify the transaction mechanism at a user equipment.

According to one aspect of the present invention, there is provided a method in a user equipment for enabling use thereof in electronic transactions, the method comprising: receiving at the user equipment control information from a management entity; and providing the user equipment with transaction means based on the received control information.

Existing transaction means of the user equipment may be modified or updated or at least one parameter for use in electronic transactions by the user equipment is changed based on said information from the management entity. The transaction means may also be initiated at the user equipment based on said information from the management entity.

Said information may be included in a data entity. The data entity may be based on an electronic data card format.

According to another aspect of the present invention there is provided an arrangement for processing electronic transactions comprising: a user equipment; a transaction service entity adapted to generate control information to be transported to the user equipment; and communication means for communication between the user equipment and the transaction service entity, wherein the arrangement is such that the user equipment can be provided with transaction means based on said control information transported to the user equipment via said communication means.

The embodiments of the invention may provide advantage since they may provide a feasible modification of the transaction mechanism. A user equipment may be enabled to be co-operative with another party even if the original implementation of the mobile user equipment is not co-operative with said other party. Some of the embodiments enable use of an user equipment for transaction in response to a request by the user in instances wherein the user equipment has not previously been setup for processing transactions. A user equipment can also be modified to meet the latest developments of the electronic transaction mechanisms. For example, the latest security functions can be introduced to the user equipment over a wireless interface.

BRIEF DESCRIPTION OF DRAWINGS

For better understanding of the present invention, reference will now be made by way of example to the accompanying drawings in which.

DESCRIPTION OF PREFERRED EMBODIMENTS OF THE INVENTION

Figure 1:
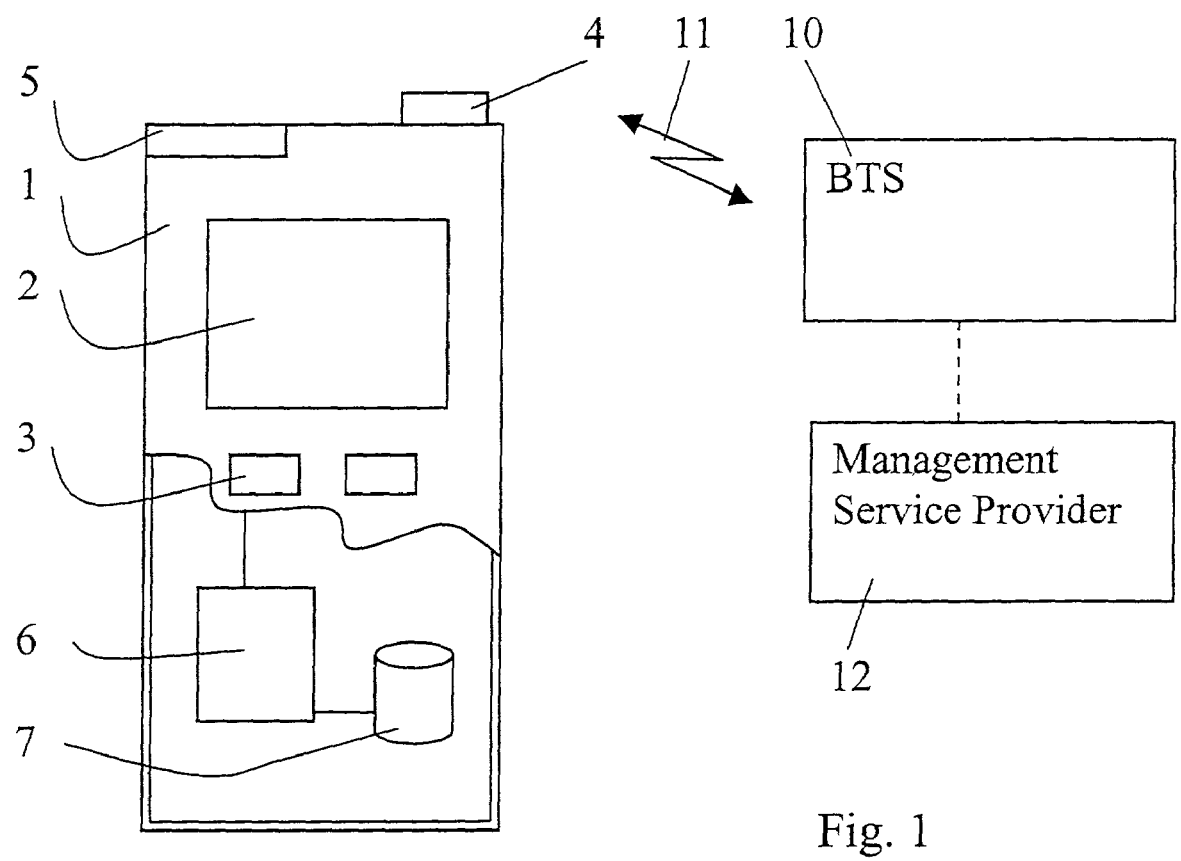
FIG. 1 shows a user equipment that can be used in the embodiments of the present invention.

FIG. 1 shows a user equipment that may be used in the embodiments of the present invention. More particularly, FIG. 1 is a partially sectioned view of a mobile station 1 that may be used for communication over a wireless interface.

If the mobile station 1 subscribes to a cellular mobile communication network the mobile station 1 may be adapted to communicate with a transceiver entity of the mobile communication network. The transceiver entity may comprise a base station (BTS) 10 of the cellular system or any other appropriate element with which the mobile station may communicate with. Possible transceivers entities are known by the skilled person and are thus not illustrated or described in any greater detail herein.

The mobile station 1 may be provided with user interface means comprising a display 2 and input means. The skilled person is familiar with the possible user interface means and communication interface means of a mobile station and therefore these will not be described in more detail herein. It is sufficient to note that the input means of the user interface means may be formed e.g. by control buttons 3 or they may include e.g. voice activation or touch screen means and so on. The communication interface means may comprise antenna means for communication with the transceiver entity 10. The antenna means may comprise an external antenna element 4, or then built-in or integrated antenna means may be used. It shall be appreciated that antenna means are not an essential requirement for the operation of the present invention.

The mobile station 1 is adapted to facilitate the user thereof to accomplish electronic transactions with other parties. For example, the user of the mobile station 1 may pay for purchases of various goods services and/or or use banking services by means of the mobile station 1. To enable this the mobile station may be provided with a credit card type transaction facility or account means wherein the user may load money. The balance can then be deducted from the account means whenever a payment is made. The mobile station 1 may also be used for ordering, negotiating or purchasing goods and/or services, for receiving a receipt of a purchase or for any other operation where transaction data needs to be exchanged between the user and another party.

The mobile station 1 is shown to comprise a processor means 6 and a data storage means 7 (i.e., a non-transitory computer-readable storage medium, such as a memory, disk, etc.). The processor means 6 is for processing and/or controlling transactions between the mobile station and other parties. The processor means 6 may be integrated with at least one other processor function of the mobile station 1. The processor means may alternatively be adapted to process data that associates with the transaction processing function only. The data storage means 7 may also be either integrated with the other functions of the mobile station 1 or be assigned solely for the transaction data processing functions. The separated transaction functions may be preferred e.g. for security or usability reasons. The above referenced account means may be implemented by means of the data storage means 7.

Possible transaction processing means will be described in more detail with reference to FIG. 2 after the following description of the other elements of the FIG. 1 arrangement.

FIG. 1 shows further a transaction management service provider entity 12. The entity 12 controls any modification operation of the transaction mechanism that may be used by the mobile user equipment 1. This entity will be referred to in the following by the term 'management service provider'.

As mentioned above, the mobile user equipment 1 may be a mobile station that subscribes to a mobile communication network. The communication network may thus provide as a communication media for communication with the management service provider 12. The mobile station 1 may access the services provided by the management service provider 12 via the mobile network. The service provider 12 may transport messages to the mobile station via the network. The communication between the network and the mobile station 1 occurs over a wireless interface between the base station 10 of the network and the mobile station, as is indicated by the double headed arrow 11.

Thus the user may access the services provided by the service provider entity 12 via the communication network. Messages may be transmitted between the mobile station 1 and the service provider 12 based on any appropriate transport system. Examples of these include, without limiting to these, Short Message Service (SMS), Wireless Application Protocol (WAP) and Internet protocol (IP) based emails.

The functioning of elements that associate with the operation of transaction means will now be explained by a way of example with reference to FIG. 2. In this example the transaction means processing the transaction functionality are referred to by the term 'electronic wallet'.

Figure 2:
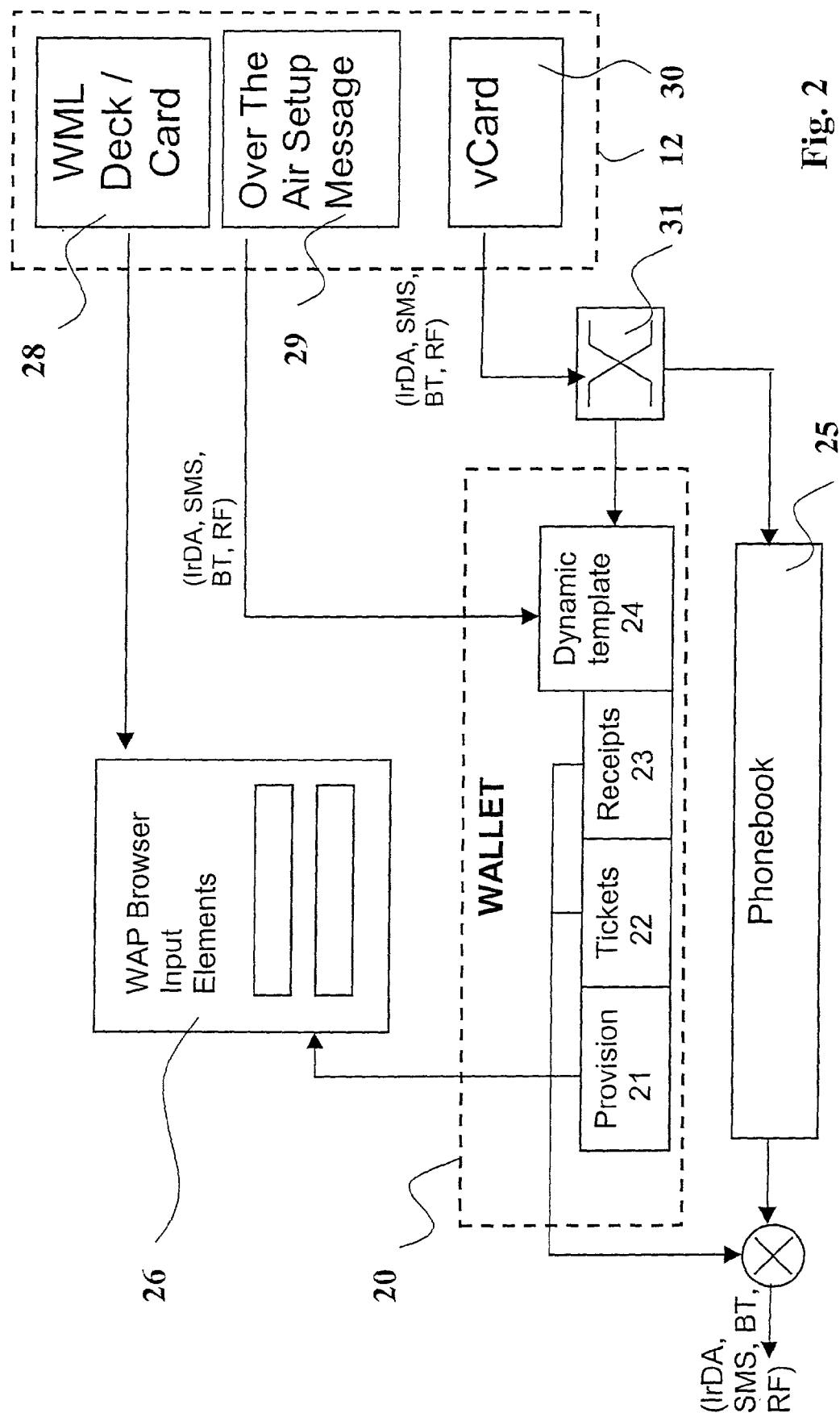
FIG. 2 illustrates system architecture for an embodiment.

FIG. 2 discloses a possible architecture for a system providing means for modifying the operation of an electronic wallet function in accordance with an embodiment of the present the invention. The electronic wallet function is designated by block 20. The electronic wallet block 20 is shown to comprise different function blocks 21 to 24. These blocks are shown to illustrate that an electronic transaction facility may provide several different usage scenarios and that these may be implemented by means of the wallet function.

FIG. 2 shows blocks such as 'provision' 21, 'tickets' 22, 'receipt' 23 and 'dynamic template' 24. It shall be appreciated that these functions are not necessary in all applications and that other subfunctions may also be provided in the wallet function 20.

From the exemplifying function blocks the provision block 21 refers to an ability of the mobile station 1 to update its own configuration based on information provided by means of the wallet function. The user may receive to the wallet information associated e.g. with a new WAP configuration, including protocol details, gateway identifier, home page and so on. Specifically, such information can be stored as a result of a transaction with a service provider.

Information of the configuration can be provided for the mobile station by means of a data card entity as will be explained in more detail later. The information may be used for an immediate change in the configuration of the transaction means. The information in the data entity or the data entity may also be stored in the wallet means and used later on whenever needed.

The tickets function block 22 refers to entries that result from a transaction. These entries may represent a certain value that may be used for another transaction. For example, an entrance ticket can be acquired to the mobile station via a wireless connection from a ticket issuer. The ticket may then be redeemed later on at an entrance gate thereby enabling use of the mobile station as an authorisation device for the entrance.

The function block 'receipt' 23 processes information associated with a proof of transaction. The receipt block 23 may be adapted such that is does not normally process other types of transactions. Specifically, the receipt block 23 may be adapted such that it does not directly represent a value that associates with a specific transaction. For example, when a purchased good is returned, or a ticket is inspected, it may not be necessary to present all details. Instead, the user equipment may only represent proof that that the transaction took place in the first place without revealing all of the detailed transaction information.

The template function block 24 is for storing information based on which the way the wallet function interacts with its environment can be modified. Thus the dynamic template 24 may be used in the reconfiguration of the transaction means.

The dynamic template block 24 may contain information such as rules, references, parameters and so on that are required for the operation of the electronic wallet function. That is, the information stored in the dynamic template block 24 can be used in the control of the electronic wallet function. The template block 24 can thus be seen as means for the wallet's own provisioning. Based on the information in the dynamic block 24 the wallet function knows how to fill in templates. The operation of the wallet function can be changed after the user has bought the mobile station by means of a new template that has been set to the dynamic block 24. The template may be "pushed" from the service provider server or then the user may download a new template by sending a request for such.

It is also possible to provide a separated support function e.g. for supporting different payment applications or protocols. As these may be run "below" the normal user interface, the user may not see any difference between different applications while different standards and protocols are provided by means of the support functions. These support function may be downloaded e.g. from the service provider server.

FIG. 2 shows also three function blocks 28, 29 and 30. These blocks will be referred to commonly in the following by definition electronic wallet management function. At least a part of the functionality of the electronic wallet management function may be controlled by the management service provider 12 of FIG. 1. The mobile station may be in communication with the blocks 28 to 30 over a wireless interface.

The control information stored in the dynamic template 24 can be updated or otherwise modified based on a message that is received from a wallet management function. For example, if the service provider is a credit card issuer the issuer may wish to transmit new security settings or credit limit to the dynamic template 24. To implement this a setup message may be generated by the setup block 29 of the management function of the service provider.

As already briefly mentioned above, the information between the mobile station and the service provider may be transported in a standardised data entity. An example of such data entities is an electronic data card that can have e.g. the format of the so called electronic business card or electronic calendar.

The electronic business card content type, that is sometimes referred to as a digital business card content type, is known by the skilled person. The electronic business cards are designed to be used instead of conventional business cards and may be used for transmitting and interchanging contact information and other information regarding a person or a group of persons to a user terminal. The user terminal may be an Internet enabled computer terminal, a mobile station, hand held organiser, personal information manager, personal data assistant, pager, fax, office equipment, and so on. That is, the user terminal may be any device capable of processing data in electronic form. The destination terminal may also store the information it received on the electronic business card. The data that may be transmitted on conventional electronic business cards may include simple text, and also elements like pictures, company logos, Web addresses, and so on. An example of the electronic business card applications that can be used for the exchange of transaction means configuration information is marketed under trade name 'vCard'.

The contact information is typically transmitted on data fields of the electronic business card. In this embodiment of the present invention the use of the fields of the electronic business is extended such that the information associated with the wallet function 20 is added on the fields. This information may be, for example, instructions to set up an electronic wallet function or instructions to modify the already existing electronic wallet mechanism.

When generating the information to be transported to the mobile station, e.g. the management service provider 12 may fill in the appropriate fields of the electronic data card. The transaction data may be inserted in the fields of the electronic data card e.g. in the following manner:

| Field | Content | Example |
|---|---|---|
| NAME | Name of the user plus any other identity information that needs to be known | "John Smith" |
| Content Type | A data field that by the existence thereof tells to the mobile station that the message is for the wallet function | "Card No"; "expiry date" |
| DATA | Information for use by the transaction mechanism | "New value of parameter A = 2" |
| KEY | Signature | F4f9hergn7hgsaw7fa 87gUyg8gytv4IuFyt |

The signature provides additional security for the data transportation and against fraudulent use of the modification mechanism. The digital signature may be based on any appropriate authorisation technique, such as public and/or private keys. The skilled person is aware of these techniques and they will not be explained in more detail herein.

The transaction data can be transported through typical electronic business card channels, e.g. based on the vCard applications. These channels include, without limiting to these email, HTTP, WAP, the short message service (SMS), Bluetooth™ and the IrDA. The electronic business cards may be stored/used in any vcard capable user equipment, such as mobile phones, personal data assistants, e-mail enabled devices, web browsers, WAP (wireless application protocol) enabled devices, Bluetooth™ enabled devices and so on.

For example, in the WAP the content type vCard is a mandatory feature. The vCard may be implemented as an object e.g. on a Wireless Application Protocol (WAP)/or World Wide Web (WWW) site. The service provider entity 12 may comprise a site providing the page that is implemented based on appropriate markup language. The possible site implementations are known by the person skilled in the art. Examples of markup languages include, without limiting to these, WML (Wireless Markup Language), HTML (Hypertext Markup Language), and XHTML (extended hypertext markup language). An appropriate mapping mechanism may be used to include configuration instructions from the page in a data entity for transportation to the mobile station.

The user may be enabled to download a modification of the electronic wallet function from the service provider entity. The user may e.g. order an update of the wallet function by transmitting an update request to the service provider entity 12.

If e.g. vcard content type is used for the messaging between the service provider entity 12 and the user equipment 1, the vCard can be combined with other content and transported e.g. within a WML or HTML message. The mobile user equipment is adapted to identify and extract vCard from the message. The processing of the WML or HTML message may be handled in the usual manner.

Content in a markup language page can be matched with content fields of a data card that is to be transmitted and may be stored in the wallet function. Each field may have an unique name or other identifier. It may be advantageous that the names of the different fields on the data card match names of the fields on the markup language page or other source of control information. The management service provider entity and/or the wallet function may also have some pre-defined settings regarding this matching. The data entity itself may provide instructions regarding the matching of the content. The information may be provided in one of the templates of the data entity.

When data e.g. from a WML page is filled in, one of the templates can be designated to provide the matching between the selected data filed (e.g. credit card details) and the WML page. Specifically, the template may be delivered together with the WML page and can be used only for the purpose of the given page.

More particularly, a wallet may store information in a form of several cards. Each card can be seen as a collection of fields, e.g. first name, last name, credit card number and so on. Each of the fields is provided with an unique identifier, such as a field name. A WML page may arrive that is to be filled in by the user. The page contains fields that should be filled in. Each field of the page also has a name, unique within the page. At least a part of the filling process can be made automatic. The wallet co-operating with the browser may be able to determine for every field from the page the matching field from the card stored in the wallet.

This matching can be achieved by different methods. Field names may be standardised so that the e.g. the last name is always in the field called 'Last_Name'. Field names may not always be standardised but the wallet function is provided with knowledge of how to match them, e.g. the wallet knows that 'Last_Name' from the page should be filled in with 'L.NAME' from the card.

Such knowledge can be passed to the wallet in different ways. The knowledge may be pre-programmed into the wallet. The knowledge may also be permanently added to the wallet. This may be done by a template. The template may be a list of relationships between fields from the card and fields from the page. If necessary, some formatting information may also be included. The template may arrive the wallet function the same way as other information does, e.g. as an electronic business card and can be stored to the wallet function in the same way as the other cards. Such a template may be disconnected from the card or from the page—it simply increases/updates the wallet's knowledge about all possible matches between the names. This type of operation is provides flexibility—a template can be added later than the card/page and there can be several templates.

A template may also arrive with a WML page. A single WAP response may contain several different contents, e.g. a WML page and one or more electronic business cards. In this case the template is an one-time template that is used to match the specific page the template associates with with an otherwise "normal" card. An advantage of this is that the service provider need not modify his WML page but may instead provide the template. Different templates may be used for different types of user equipment and wallets.

The same template-based mechanism can be used for the user equipment or wallet function provisioning. The template may arrive also with a data card (for example two vCards may arrive at the same time) so that the template applies to the card.

The provisioning information can be sent as an electronic data card. It is thus possible to send two data cards such that one includes provisioning information and the other includes the template. The cards can be sent together or separated.

The following is an example of the provisioning. A user equipment may have several WAP-related parameters like calling number, gateway IP, home page and so on. All these parameters can be provided by the operator as a single data card to every user equipment that is using the service. However, user equipment may be provided by different manufacturers and may have different internal naming for the same WAP-related parameter. For example, gateway in one terminal is identified as 'Gateway_IP' while in others as 'Gate'. The operator is aware of the manufacturer of the different user equipment and thus the operator may send the same data card to all user equipment that says:

'my_gateway'='"128.12.13.14'

However, for all user equipment coming from the first manufacturer the operator may also send the data card telling 'my_gateway'='"Gateway_IP' while for all user equipment from the second manufacturer the operator may send a data card telling 'my_gateway'='Gate'

If the operator is broadcasting the data cards he can distribute the first message much faster and with less bandwidth. If the first message is distributed e.g. as part of a subscriber identity module (SIM), the first message may be provided for every user equipment. The user equipment may then wait for the second message to provide provisioning information.

The wallet function may also require some other provisioning information. For example, a maximum number of cards, definition of reactions on some events and so on. Such provisioning can also be done by means of 'provisioning data card' and 'template data card' so that the wallet function stores and processes its own provisioning information.

In the above described wallet reconfiguration process the wallet with a template can be seen as a reconfigured wallet function.

The service provider entity 12 may push data towards the user e.g. by means of a WAP or HTML server.

A data card handling routine can be added into the data card recognition software running in the processor means 6 of the user device 1. In FIG. 2 this software could be implemented in a splitter 31. The routine may also be provided by means of the browser 26. The data card handling routine may be adapted to detect that an incoming business card or similar data entity is a data entity that contains information associated with the wallet function and to route the data entity to an appropriate data storage means for later use.

FIG. 2 shows also a phonebook block 25. In conventional arrangements the phonebook block 25 is the usual destination of a data card such as the vcard. In the embodiments of the invention any such data card that does not associate with transactions may be routed by the splitter 31 to the phonebook 25 or any other similar function instead of the wallet function 20. The user equipment may also ignore any such data card entities.

A possible data entity for the transmission of data between the mobile station and the co-operative device is a data card based on the so called the Electronic Commerce Modelling Language (ECML). The ECML is an open specification that is indented for use in the exchange of purchase related information such as order and payment information in the World Wide Web (WWW). The EMCL defines also a way how specific field information like names, addresses and credit card information can be formatted and transported in the WWW in a standardised manner. The wallet function of the mobile station may be adapted to automatically recognise the ECML data card form in a similar manner as it recognises the vcard type data cards.

A still further example of formats that may be used for the data card is a format based on an appropriate electronic calendar format. An example of the electronic calendar formats is the vCal.

Figure 3:
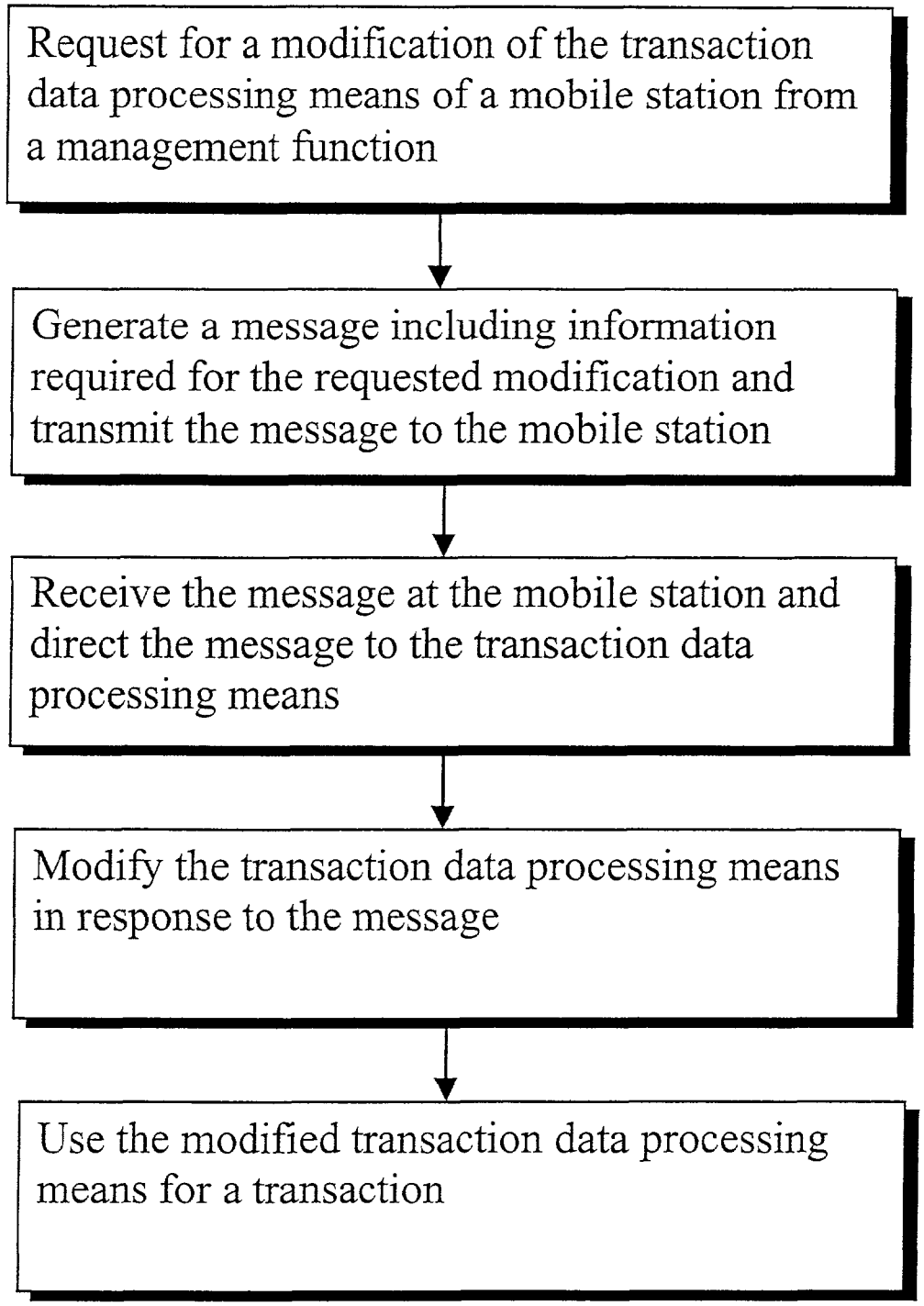
FIG. 3 is a flowchart illustrating the operation of one embodiment of the present invention.

Referring now also to the flowchart of FIG. 3, operation in accordance with an embodiment of the present invention will be described in more detail. The exemplifying embodiment relates to a situation where the user wishes to start using a new transaction mechanism. For example, the user may wish to purchase goods or services from a new merchant entity. A reference to a merchant entity shall be understood to be a reference to any organisation from which the user may purchase goods and/or services. The new merchant may use transaction mechanism that is not compatible with the mechanism the mobile station is adapted to. An "old" merchant may have changed the transaction mechanism thereof in such a way that the mobile station is no longer compatible with it, and thus needs an update.

The user may sent to the service provider 12 a request for modification of the transaction processing means. The request may be based on e.g. a markup language or the SMS format. The request is routed to the wallet management function. After the receipt of the request the management function may perform security functions, such as verification of keys or other type of authentication.

The user equipment may be identified for the authentication purposes based on an identity code. Examples of the possible identity codes include, without limiting to these, the international mobile subscriber identity (IMSI) code, a unique product code assigned for each user equipment or a personal identity number (PIN) of the user.

After it has been determined that the mobile station in entitled to receive the requested modification, the management function generates a message including necessary information for the modification. The message may comprise a data entity such as the electronic data card described above. The information is transmitted via the base station of the cellular network to the mobile station.

After reception of the message it is detected at the mobile station that the received message shall be routed to the wallet function. The message is then directed to the wallet function for further processing. Those features of the wallet function that require modification so that they are co-operative with the new transaction mechanism are then changed. After the modification procedure is complete the mobile station may be used for transactions with the new merchant.

The electronic wallet function may be installed in a mobile user equipment before the equipment is delivered to a user. The installation can be done during the manufacture of the user equipment. The wallet function may be installed in its entirety during the manufacture of the user equipment. It is also possible that the required hardware is installed "empty" and the required transaction functions are then setup later on, when required. For example, the wallet function of a mobile user equipment can be setup just before the user equipment is given to the user. The setup may be done e.g. by the network operator.

A possibility is to setup the wallet function based on control instruction received e.g. by means of templates from a server of the remote management service provider. This can be accomplished in a manner that is similar to the above described update procedures.

According to a further embodiment a user equipment that has not been originally provided with a wallet function is provided with an add-on type wallet function. For example, the wallet function may be added later on to a user equipment by means of a smart card or other modular wallet function. The above mechanism can then be used to initiate the added wallet function or to reconfigure the added wallet function in a similar manner as explained above.

In some application it may be possible to reprogram or update the control software of a mobile user equipment to provide the transaction processing means without any addition of new hardware.

Referring now again to FIG. 1, according to an embodiment the mobile station 1 be provided with a wireless transmitter and/or receiver module 5. The module 5 is not for communication with the base station 10 of the cellular communication system, but is instead for the provision of a local communication link with a co-operative device.

In this embodiment the data entities are not transmitted to and/or from the user equipment 1 via a data communication network. Instead, the communication occurs via local wireless links.

The module 5 may be based on use of infrared links, short range radio links, and so on. The infrared link may be based e.g. on the IrDA. The IrDA is a standard defined by Infrared Data Association. The short range radio link may be based e.g. on the Bluetooth™ protocol. The term Bluetooth™ refers to a technology specification by Bluetooth special interest group (SIG) for small factor, low-cost, short range radio links (SRRL) between various devices provided with a Bluetooth™ wireless modules. Another example of the short range interfaces is based on technology used for the so called contactless cards or proximity cards. A short range link for proximity cards is defined e.g. by the International Standardisation Organisation (ISO) specification No. ISO 14443.

A transaction may occur between the mobile user equipment and a party that is connected to a data communication network such as the IP protocol based internet. In such a case the user may use the user equipment for transactions that associate with the purchase of goods and/or services via the data network. The user equipment may use any appropriate communication protocol. The communication path towards the other parties is indicated by communication means 32 in FIG. 2.

According to an embodiment the user uses his/hers mobile user equipment as a means of payment instead of cash or conventional credit or debit cards, e.g. when making a purchase in a shop or entering a bus. The mobile user equipment may process the transaction with a centralised transaction handling system by communication via a communication network. The user equipment may also communicate locally with a local transaction handling device, such as a Bluetooth™, IrDA or proximity card enabled cashier device.

It should be appreciated that whilst embodiments of the present invention have been described in relation to mobile user devices, embodiments of the present invention are applicable to any other suitable type of user equipment that support electronic transactions.

It is also noted herein that while the above describes exemplifying embodiments of the invention, there are several variations and modifications which may be made to the disclosed solution without departing from the scope of the present invention as defined in the appended claims.

The invention claimed is:

1. A method, comprising:
   causing, at least in part, actions that result in wireless reception, by a mobile station from a management service provider, of a message comprising control information for updating the mobile station with settings of an electronic transaction mechanism for wirelessly conducting a transaction by the mobile station directly with a merchant, wherein the merchant is independent of the management service provider; and
   updating the electronic transaction mechanism of the mobile station in response to receipt of the message, at the mobile station from the management service provider, and in accordance with the control information of the message, wherein, after updating, the mobile station is configured to conduct the transaction by the mobile station directly with the merchant according to the updated electronic transaction mechanism and without the management service provider.

2. The method of claim 1, further comprising:
   attempting, by the mobile station, to conduct the transaction directly with the merchant; generating, by the mobile station in response to attempting to conduct the transaction directly with the merchant, a request for modification of the mobile station; and
   causing, at least in part, actions that result in wireless transmission, by the mobile station to the management service provider, of the request for modification.

3. The method of claim 1, wherein the message is wirelessly received by the mobile station without the mobile station sending a request for modification to the management service provider.

4. The method of claim 1, further comprising conducting the transaction by the mobile station directly with the merchant after updating the mobile station with the control information of the message from the management service provider.

5. The method of claim 4, wherein conducting the transaction by the mobile station directly with the merchant comprises:
   causing, at least in part, actions that result in wireless reception, by the mobile station from the merchant, of a template configured to provide a matching between data of the mobile station and a web page of the merchant;
   applying data of the mobile station to the web page of the merchant in accordance with the matching of the template to automatically generate a filled-in web page; and
   causing, at least in part, actions that result in wireless transmission, from the mobile station to the merchant, of the filled-in web page.

6. The method of claim 1, wherein the message is configured in one of the formats selected from: an electronic business card, an electronic calendar, and an electronic commerce modeling language.

7. The method of claim 1, wherein the mobile station is configured to wirelessly receive the message from the management service provider via a base station of a cellular mobile communication network of the mobile station, and wherein the mobile station is configured to wirelessly conduct the transaction directly with the merchant by a wireless transmitter and receiver module using one of the wireless communication formats selected from: infrared and Bluetooth.

8. The method of claim 1, wherein the message comprises a dynamic template comprising the control information for updating the mobile station, and
   wherein the transaction mechanism is defined by at least one of a communication medium between the mobile station and the merchant, a predefined transaction protocol and parameters, a predefined content transfer and presentation format, and a security mechanism.

9. The method of claim 1, wherein the control information of the message is configured to update a dynamic template of the mobile station, and wherein updating the mobile station comprises updating the dynamic template of the mobile station in accordance with the control information of the message.

10. The method of claim 9, wherein, after updating, the mobile station of the mobile station is configured to conduct the transaction by the mobile station directly with the merchant and without the management service provider by applying the dynamic template of the mobile station to a webpage of the merchant.

11. The method of claim 1, wherein updating the mobile station comprises updating a template configured to provide a matching between data of the mobile station and fields required by the merchant to conduct the transaction.

12. An apparatus, comprising:
    at least one processor; and
    at least one memory including computer program code,
    the at least one memory and the computer program code configured to, with the at least one processor, cause the apparatus to perform at least the following,
    cause, at least in part, actions that result in wireless reception, from a management service provider, of a message comprising control information for updating the apparatus with settings of an electronic transaction mechanism for wirelessly conducting a transaction directly with a merchant, wherein the merchant is independent of the management service provider; and
    update the electronic transaction mechanism of the apparatus, in response to receipt of the message from the management service provider and in accordance with the control information of the message, wherein after updating, the apparatus is configured to conduct the transaction directly with the merchant according to the updated electronic transaction mechanism and without the management service provider.

13. The apparatus of claim 12, further comprising:
    an antenna that communicates with the management service provider via a base station of a cellular mobile communication network of the apparatus to cause, at least in part, actions that result in wireless reception of the message from the management service provider; and
    a wireless transceiver that wirelessly communicates with the merchant to wirelessly conduct the transaction with the merchant.

14. The apparatus of claim 12, wherein the wireless transceiver is configured to wirelessly communicate with the merchant according to one of the communication formats selected from: infrared and Bluetooth.

15. The apparatus of claim 12, wherein the apparatus is further caused to generate a request for modification of transaction data processing, to cause, at least in part, actions that result in wireless transmission of the request for modification to the management service provider, and to cause, at least in part, actions that result in wireless transmission of the request for modification from the apparatus to the management service provider.

16. The apparatus of claim 15, wherein the transaction data processing is updated in response to receipt of a message wirelessly received by the apparatus from the management service provider.

17. The apparatus of claim 15, wherein the transaction data processing comprises a template configured to provide a matching between data of the transaction data processing means and fields required by the merchant to conduct the transaction.

18. The apparatus of claim 17, wherein the template is configured to provide a matching between data of the transaction data processing and a web page of the merchant, and wherein the transaction data processing the data of the transaction data processing to the web page of the merchant in accordance with the matching of the template to automatically generate a web page wherein at least some fields of the web page are filled-in by the transaction data processing.

19. The apparatus of claim 17, wherein the transaction data processing is updated by updating the template according to the control information of the message wirelessly received from the management service provider.

20. The apparatus of claim 15, wherein the transaction data processing is updated by data in fields of the message, wherein the message has a format selected from: an electronic business card, an electronic calendar, and an electronic commerce modeling language.

21. The apparatus of claim 15, wherein the message comprises a dynamic template comprising the control information for updating the transaction data processing, and wherein the transaction data processing is updated according to the control information of the dynamic template.

22. A non-transitory computer-readable storage medium carrying one or more sequences of one or more instructions which, when executed by one or more processors, cause an apparatus to perform at least the following steps:
   causing, at least in part, actions that result in wireless reception, from a management service provider, of a message comprising control information for updating the apparatus with settings of an electronic transaction mechanism for wirelessly conducting a transaction directly with a merchant, wherein the merchant is independent of the management service provider; and
   updating the electronic transaction mechanism of the apparatus, in response to receipt of the message from the management service provider and in accordance with the control information of the message, wherein after updating, the apparatus is configured to conduct the transaction directly with the merchant according to the updated electronic transaction mechanism and without the management service provider.

23. The computer-readable storage medium of claim 22, wherein the apparatus is caused to further perform:
   attempting to conduct the transaction directly with the merchant; in response to attempting to conduct the transaction directly with the merchant, generate a request for modification of the apparatus; and
   causing, at least in part, actions that result in wireless transmission, to the management service provider, of the request for modification.

24. The computer-readable storage medium of claim 22, wherein the apparatus is caused to further perform: conducting the transaction directly with the merchant after updating the apparatus with the control information of the message from the management service provider.

25. The computer-readable storage medium of claim 24, wherein the apparatus conducts the transaction directly with the merchant by performing the following:
   causing, at least in part, actions that result in wireless reception, from the merchant, of a template configured to provide a matching between data of the apparatus and a web page of the merchant;
   applying data of the apparatus to the web page of the merchant in accordance with the matching of the template to automatically generate a filled-in web page; and
   causing, at least in part, actions that result in wireless transmission to the merchant of the filled-in web page.

26. The computer-readable storage medium of claim 22, wherein the control information of the message is configured to update a dynamic template of the apparatus, wherein updating the apparatus comprises updating the dynamic template of the apparatus in accordance with the control information of the message, and wherein, after updating, the apparatus is configured to conduct the transaction directly with the merchant and without the management service provider by applying the dynamic template of the apparatus to a webpage of the merchant.

* * * * *